United States Patent
Saha et al.

(10) Patent No.: US 10,989,620 B2
(45) Date of Patent: Apr. 27, 2021

(54) GAS TURBOMACHINE LEAK DETECTION SYSTEM AND METHOD

(71) Applicant: General Electric Company, Schenectady, NY (US)

(72) Inventors: Rajarshi Saha, Bangalore (IN); Mohamad-Maher Aboujaib, Belfort (FR); Bouria Faqihi, Dubai (AE); Sindhu Penna, Bangalore (IN)

(73) Assignee: General Electric Company, Schenectady, NY (US)

( * ) Notice: Subject to any disclaimer, the term of this patent is extended or adjusted under 35 U.S.C. 154(b) by 316 days.

(21) Appl. No.: 16/109,057

(22) Filed: Aug. 22, 2018

(65) Prior Publication Data

US 2019/0094100 A1  Mar. 28, 2019

(30) Foreign Application Priority Data

Sep. 26, 2017 (EP) .................................. 17290124

(51) Int. Cl.
*G01M 3/22* (2006.01)
*G01M 3/02* (2006.01)
(Continued)

(52) U.S. Cl.
CPC ............ *G01M 3/222* (2013.01); *G01M 3/025* (2013.01); *G01M 3/38* (2013.01); *G01M 15/14* (2013.01); *F05D 2260/83* (2013.01)

(58) Field of Classification Search
CPC .......... G01M 3/04; G01M 3/025; G01M 3/20; G01M 3/38; G01M 15/14; F05D 2260/83
See application file for complete search history.

(56) References Cited

U.S. PATENT DOCUMENTS

| 6,438,963 B1* | 8/2002 | Traver | F23K 5/147 |
| | | | 60/779 |
| 2005/0096832 A1* | 5/2005 | Takada | B08B 9/00 |
| | | | 701/100 |

(Continued)

FOREIGN PATENT DOCUMENTS

| DE | 102016114439 A1 | 2/2017 | |
| EP | 0915240 A1 * | 5/1999 | ............. F02C 7/222 |

(Continued)

OTHER PUBLICATIONS

Machine Translation of EP-0915240 (Year: 1999).*

(Continued)

*Primary Examiner* — Nathaniel J Kolb
(74) *Attorney, Agent, or Firm* — Dority & Manning, P.A.

(57) ABSTRACT

Various embodiments include an offline leak detection system for a turbomachine fuel system. In some embodiments, the leak detection system includes: a fluid supply system fluidly connected to at least one fuel line of the turbomachine, the fluid supply system for delivering a non-flammable fluid to the combustor; a control system operably connected to the fluid supply system, the control system controlling a flow of the non-flammable fluid through the at least one fuel line, and controlling a pressure of the non-flammable fluid in the at least one fuel line to a pressure substantially equal to an operational fuel pressure of the turbomachine; and an optical monitor for determining a presence of the non-flammable fluid on an exterior of the at least one fuel line, the presence of the non-flammable fluid on the exterior of the at least one fuel line indicating a leak.

19 Claims, 3 Drawing Sheets

(51) Int. Cl.
  *G01M 3/38* (2006.01)
  *G01M 15/14* (2006.01)

(56) References Cited

U.S. PATENT DOCUMENTS

| | | |
|---|---|---|
| 2010/0201983 A1 | 8/2010 | Hatano et al. |
| 2011/0277480 A1* | 11/2011 | Aboujaib ................ F23K 5/18 |
| | | 60/734 |
| 2013/0330172 A1* | 12/2013 | Scipio .................. F01D 25/002 |
| | | 415/116 |
| 2016/0084728 A1 | 3/2016 | Ekanayake et al. |
| 2016/0115867 A1* | 4/2016 | Zhang ..................... F01K 23/16 |
| | | 60/39.182 |

FOREIGN PATENT DOCUMENTS

| | | |
|---|---|---|
| EP | 0915240 A1 | 5/1999 |
| GB | 2328750 A | 3/1999 |

OTHER PUBLICATIONS

Human translation of EP0915240 (Year: 1999).*
European Search Report and Written Opinion dated Mar. 21, 2018 which was issued in connection with EP patent application No. EP17290124.1 which was filed on Sep. 26, 2017.

* cited by examiner

GAS TURBOMACHINE LEAK DETECTION SYSTEM AND METHOD

FIELD OF THE DISCLOSURE

The subject matter disclosed herein relates to detecting liquid fuel leaks. More particularly, aspects of the disclosure include systems and methods for detecting liquid fuel leaks in offline gas turbomachine systems.

BACKGROUND OF THE DISCLOSURE

Power generation systems oftentimes employ one or more gas turbomachine systems, which may be coupled with one or more steam turbomachine systems, to generate power. A gas turbomachine (GT) system may include a multi-stage axial flow compressor having a rotating shaft. Air enters the inlet of the compressor and is compressed by the compressor blade stages and then is discharged to a combustor where fuel, such as heavy oils, naphtha, diesel fuel (e.g., distillate), flare gas, synthesis gas (or, syngas), landfill gas and/or natural gas, is burned to provide a high energy combustion gas flow to drive a turbine component. In the turbine component, the energy of the hot gases is converted into work, some of which may be used to drive the integral compressor through a rotating shaft, with the remainder available for useful work to drive a load such as a generator via a rotating shaft (e.g., an extension of the rotating shaft) for producing electricity.

As described above, some gas turbomachine systems may use liquid fuel sources burned in one or more combustors to provide a high energy combustion gas flow to a turbine. The liquid fuel may be supplied from a fuel source to the combustor(s) by fuel lines that may include many mechanical connection points. During scheduled maintenance, the mechanical connection points of the fuel lines may be disconnected and inspected. Upon reassembly, the mechanical connection points of the fuel line may include one or more imperfect seals due to mechanical defects or workmanship errors. Each mechanical connection point is a potential location for an imperfect seal and therefore a fuel leak. If liquid fuel leaks from the fuel lines it can cause downtime while the turbomachine is powered down to address the situation. It may be desirable to test the fuel lines for leaks prior to startup of the turbomachine in order to avoid such downtime.

Many gas turbomachine fuel systems include fuel control valves at some point upstream of the combustor. Typical fuel system leak tests may include closing the fuel control valves and pressurizing the closed fuel lines to check for leaks. However, such a method neglects the fuel lines downstream of the valve(s), between the downstream control valve(s) and the combustor(s). In such a method, the fuel lines between the control valve(s) and the combustor(s) are not tested for leaks at operational fuel pressure. As such, conventional fuel leak detection systems can be ineffective for identifying all leaks in a fuel line of an offline turbomachine.

BRIEF DESCRIPTION OF THE DISCLOSURE

A first aspect of the disclosure provides a method of detecting a leak in a fuel system of a turbomachine having at least one combustor including a combustion chamber, the method including: pressurizing a fuel line immediately upstream of the combustion chamber with a non-flammable fluid to a pressure substantially equal to an operational fuel pressure of the turbomachine; and optically monitoring an exterior of the fuel line of the fuel system to determine a presence of the non-flammable fluid at the exterior of the fuel line, the presence of the non-flammable fluid on the exterior of the fuel line indicating a leak.

A second aspect of the disclosure provides a leak detection system for a fuel system of a turbomachine having at least one combustor including a combustion chamber, the leak detection system including: a fluid supply system fluidly connected to at least one fuel line of the turbomachine, the fluid supply system for delivering a non-flammable fluid to the combustor; a control system operably connected to the fluid supply system, the control system controlling a flow of the non-flammable fluid through the at least one fuel line, and controlling a pressure of the non-flammable fluid in the at least one fuel line to a pressure substantially equal to an operational fuel pressure of the turbomachine; and means for determining a presence of the non-flammable fluid on an exterior of the at least one fuel line, the presence of the non-flammable fluid on the exterior of the at least one fuel line indicating a leak.

A third aspect of the disclosure provides a fuel line leak detection system for a gas turbomachine including: a non-flammable fluid source fluidly connected to at least one fuel line of the turbomachine upstream of at least one combustor of the turbomachine, the at least one fuel line delivering a non-flammable fluid to the at least one combustor; a multi-port valve fluidly connected to the at least one fuel line between the non-flammable fluid source and the at least one combustor, the multiport valve directing the non-flammable fluid to individual ones of the at least one combustor; a pressure source fluidly connected to the at least one fuel line, the pressure source configured to pressurize the at least one fuel line immediately upstream of the combustor with the non-flammable fluid to a pressure substantially equal to an operational fuel pressure of the turbomachine; and means for determining a presence of the non-flammable fluid on an exterior of the at least one fuel line, the presence of the non-flammable fluid on the exterior of the at least one fuel line indicating a leak.

A fourth aspect of the disclosure provides a method of detecting a leak in a fuel system of a turbomachine having at least one combustor including a combustion chamber, the method including: pressurizing a fuel line immediately upstream of the combustion chamber with a non-flammable fluid to a pressure substantially equal to an operational fuel pressure of the turbomachine; optically monitoring an exterior of the fuel line of the fuel system to determine a presence of the non-flammable fluid at the exterior of the fuel line, the presence of the non-flammable fluid on the exterior of the fuel line indicating a leak; and supplying compressed air to at least one air passage of the combustor during the pressurizing of the fuel line to prevent the non-flammable fluid from leaving the combustor through the at least one air passage during the pressurizing of the fuel line.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings are not to scale. The drawings are intended to depict only typical aspects of the disclosure, and therefore should not be considered as limiting the scope of the disclosure. In the drawing, like numbering represents like elements between the drawings.

DETAILED DESCRIPTION

As noted, the subject matter disclosed herein relates to detecting fuel leaks. More particularly, aspects of the disclosure include systems and methods for detecting fuel leaks in an offline gas turbomachine system, i.e., when the turbomachine is not firing or producing work.

Typical offline fuel line leak testing may include closing fuel valves in the fuel line and pressurizing the fuel line upstream of the valves to check for leaks. However, this approach ignores the fuel lines between the valve(s) and the combustor(s). In contrast to conventional approaches, various embodiments of the present disclosure include systems and methods for detecting leaks in an offline gas turbomachine fuel system by pressurizing fuel lines immediately upstream of the combustor. The following detailed description refers to a leak detection system for detecting a leak in a fuel line upstream of one combustor for clarity. It should be understood that gas turbomachine systems may include a plurality of combustors each with a separate fuel line upstream of corresponding combustors. The leak detection system described herein may be applied to turbomachine systems having one or more combustors as will be described below.

Figure 1:
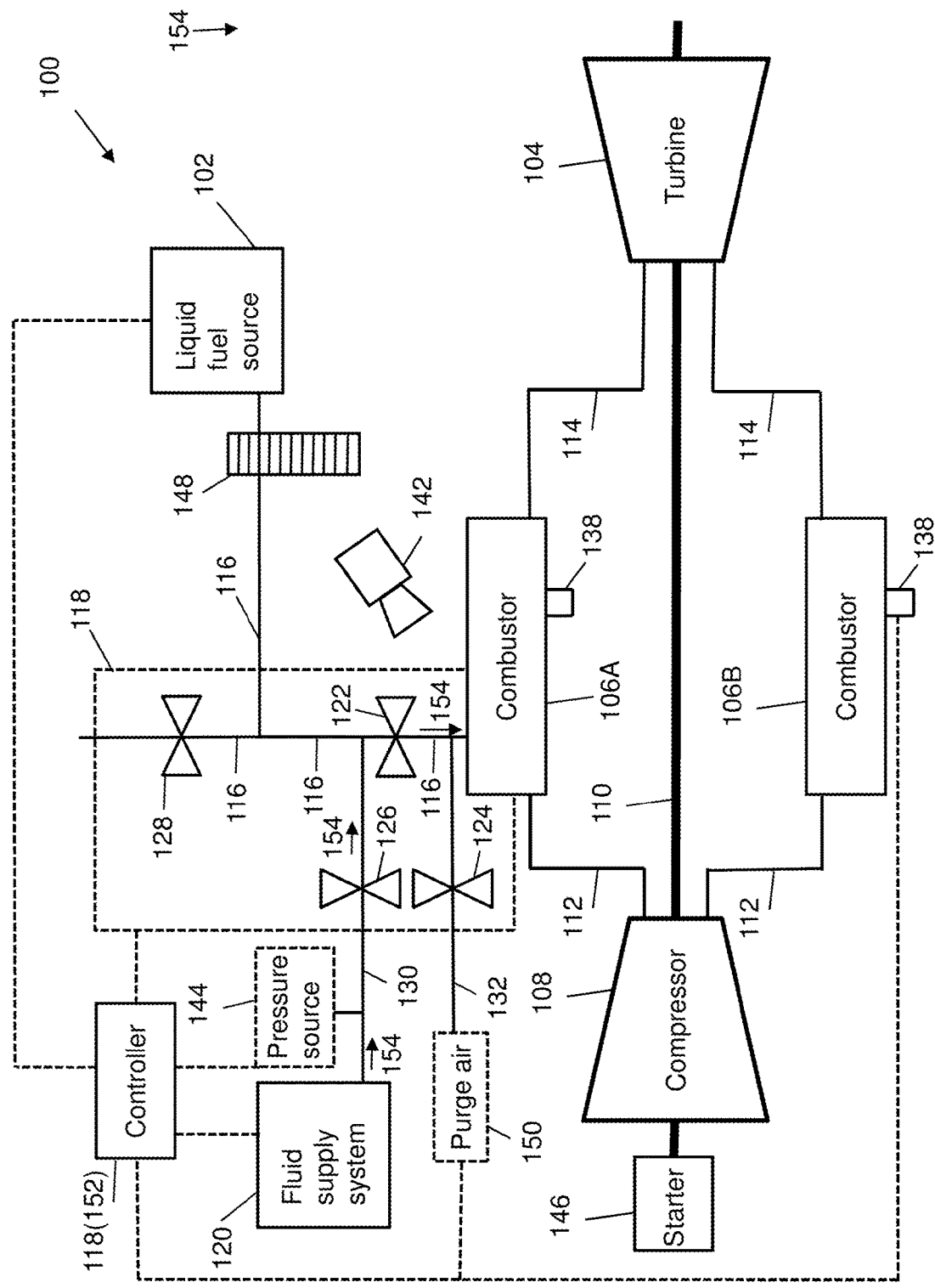
FIG. 1 shows a schematic diagram of a turbomachine system and corresponding leak detection system according to embodiments of the disclosure.

FIG. 1 shows a schematic view of a gas turbomachine system 100. Gas turbomachine system 100 may include a compressor 108, one or more combustors 106A, 106B, and a turbine 104. In one embodiment, compressor 108 and turbine 104 may be attached to a rotating shaft 110. Compressor 108 may include one or more airfoil stages (not shown) that compress air as compressor 108 rotates about shaft 110. Compressed air 112 from compressor 108 may be supplied to combustors 106. A fuel source 102 may supply fuel to combustors 106 via fuel lines 116. The air and fuel mixture in combustors 106 may be ignited to produce a high energy gas flow 114. High energy gas flow 114 may be supplied to turbine 104. Turbine 104 may include one or more airfoil stages (not shown) that convert high energy gas flow 114 into rotational work applied to shaft 110. A portion of the work may be used to rotate integral compressor 108, while the remaining portion of the work may be directed to a load (not shown) attached to shaft 110. In some embodiments, the load may include a generator for producing electricity. In other embodiments, the load may include additional compressor, or other means of using the rotational work supplied to shaft 110 by turbine 104. It should be noted that turbomachine system 100 shown in FIG. 1 is an example embodiment provided to clearly show details of the disclosure. However, it should be understood that the present disclosure may be applied to turbomachine systems having different configurations of compressor 108, combustor(s) 106, and turbine 104. For example, compressor 108 may not be attached to the same shaft as turbine 104. In addition, turbomachine system 100 may have any number of combustors 106. FIG. 1 shows two combustors 106 for clarity.

FIG. 1 also shows a control system 118 fluidly connected to fuel source 102 and combustor 106A by fuel lines 116, and fluidly connected to a fluid supply system 120 by fluid lines 130. Control system 118 may include a computer controller 152 communicatively connected to valves 128, 122, 124, 126, fuel source 102, fluid supply system 120, pressure source 144, and drains 138 as shown in FIG. 1. Computer controller 152 may include, for example, a Mark VIe Distributed Control System provided by General Electric Company, or a similar industrial controller. In one embodiment, control system 118 may be configured to actuate valves from an open state to a closed state, or in between. Control system 118 may also be configured to adjust voltages of pumps within fluid supply system 120 and/or pressure source 144. In one embodiment, fluid supply system 120 may include a source of a non-flammable fluid 154. It is anticipated that liquid fuel itself may be used to test fuel lines 116 for leaks while turbomachine system 100 is offline and cooled down (i.e., to room temperature). However, there may be additional safety concerns and fuel costs if liquid fuel is used to test fuel lines 116 for leaks. As such, the present disclosure describes using a non-flammable fluid 154 instead of liquid fuel to test for leaks in fuel line 116.

Fluid supply system 120 may be fluidly connected to fuel line 116. In such an embodiment, fluid supply system 120 may include a source of non-flammable fluid 154 and be configured to deliver non-flammable fluid 154 through fuel lines 116 to combustor 106A. In one embodiment, fluid supply system 120 may include a water injection system of turbomachine system 100. Turbomachine system 100 may include a water injection system for purposes such as an offline water wash. An offline water wash typically includes directing water to compressor 108 while turbomachine system 100 is offline (i.e., not firing or producing work) for the purpose of removing pollution and other contaminants that may build up on the interior of compressor 108 over time, causing reduced turbine efficiency. In one embodiment, fluid supply system 120 may include such a water injection system, however instead of directing water to compressor 108, water may be directed to combustor 106A through control system 118.

Control system 118 may include a plurality of valves 122, 124, 126, 128, fuel lines 116, fluid lines 130, and air lines 132 configured to control a flow of non-flammable fluid 154 from fluid supply system 120 through fuel lines 116 to combustor 106A. FIG. 1 also shows a flow divider 148 fluidly connected to fuel line 116 between fuel source 102 and valve 122. As explained above, FIG. 1 shows control system 118 corresponding to a single combustor 106A. In some embodiments, turbomachine system 100 may include a plurality of combustors 106. In such an embodiment, flow divider 148 may direct fuel to a plurality of fuel lines and the corresponding combustors 106. FIG. 1 shows flow divider 148 directing fuel to one fuel line 116 and corresponding combustor 106A. Multiple fuel lines and combustors 106 are omitted from FIG. 1 for clarity.

During normal work-producing operation (referred to herein as working operation) of turbomachine system 100, control system 118 may be configured to direct fuel from fuel source 102 to combustor 106A. In such a situation, valve 122 may be fluidly connected to fuel line 116 between fuel source 102 and combustor 106A. Valve 122 may include a fuel metering valve 122 (i.e., a 2-way check valve, or a 3-way check valve) for controlling an amount of fuel directed to combustor 106A. During working operation of turbomachine system 100 (i.e., firing and producing work), fuel metering valve 122 may be configured to control the amount of fuel supplied to combustor 106A. In such a situation, fuel metering valve 122 may be the final valve in fuel line 116 before the fuel reaches combustor 106A. In other words, fuel metering valve 122 may be the first valve immediately upstream of combustor 106A. During this working operation, fuel metering valve 122 may be at least partially open to allow fuel to flow to combustor 106A, while valves 124, 126, and 128 may be closed. During working operation, fuel source 102 and fuel metering valve 122 together may control the fuel pressure within fuel line 116 immediately upstream of combustor 106A. In one example, the fuel pressure in fuel line 116 immediately upstream of combustor 106A during working operation may be approximately 4.2 Megapascals (MPa). In some embodiments the fuel pressure immediately upstream of combustor 106A may range from approximately 3.4 MPa-4.8 MPa.

In one embodiment, valve 128 may include a drain valve 128, for example, a multiport drain valve 128. Multiport drain valve 128 may be fluidly connected to a plurality of fuel lines that are connected to a corresponding plurality of combustors. FIG. 1 shows multiport drain valve 128 fluidly connected to a single fuel line 116 for clarity. In one stage of operation, control system 118 may open multiport drain valve 128 to drain fuel from fuel line 116 prior to leak testing. In another stage of operation, control system may open multiport drain valve 128 to drain non-flammable fluid 154 from fuel line 116 after completion of leak testing. FIG. 1 also shows purge valve 124 fluidly connected between a source of purge air 150 (i.e., compressed air) and fuel line 116. Control system 118 may open purge valve 124 to direct purge air into fuel line 116 to provide additional means of draining fuel line 116. In one embodiment, control system 118 may open purge valve 124 to provide additional means of removing fuel from fuel line 116 prior to leak testing. In another embodiment, control system 118 may open purge valve 124 to provide additional means of removing non-flammable fluid 154 from fuel line 116 after leak testing and before startup (i.e., firing) of turbomachine system 100.

During leak detection, control system 118 may be configured to stop directing fuel to fuel line 116, and start directing non-flammable fluid 154 to fuel line 116. In such an embodiment, control system 118 may open valves 126 and 122, and start the flow of non-flammable fluid 154 to combustor 106A. In one embodiment, valve 126 may include a multiport flush valve 126. Multiport flush valve 126 may include a plurality of outputs (not shown) each fluidly connected to one or more of a plurality combustors 106 and corresponding fuel lines (as explained above, a plurality of combustors and corresponding fuel lines is not shown for clarity). FIG. 1 shows multiport flush valve 126 fluidly connected to fluid supply 120 and one combustor 106A by fuel line 116. In one embodiment, control system 118 may control the pressure of non-flammable fluid 154 in fuel line 116 directly upstream of combustor 106A (i.e., between fuel metering valve 122 and combustor 106A) to a pressure at least substantially equal to the operational fuel pressure of the turbomachine system. As described above, in one embodiment the operational fuel pressure of the turbomachine system may be approximately 4.2 MPa. In other embodiments, the operational fuel pressure may range from approximately 3.4 MPa-4.8 MPa. Control system 118 may control the pressure of non-flammable fluid 154 in fuel line 116 by actuating multiport flush valve 126, or adjusting fluid supply system 120.

In some embodiments, fluid supply system 120 may include a water injection system of turbomachine system 100. Fluid supply system 120 may include a water pump that is able to pressurize fuel line 116 with non-flammable fluid 154 to the operational fuel pressure of the turbomachine system. However in some embodiments, an additional pressure source 144 may be used to control the pressure of non-flammable fluid 154 in fuel line 116 to the operational fuel pressure of the turbomachine system. Pressure source 144 may include a variable frequency drive (VFD) pump configured to control volume and pressure of non-flammable fluid 154 in fuel line 116. In an alternative embodiment, pressure source 144 may include a non-VFD pump (i.e., constant speed pump) configured to pressurize fuel line 116 to the operational fuel pressure of the turbomachine system, along with a recirculation valve (not shown) configured to return excess flow of non-flammable fluid 154 to fluid supply system 120.

Once fuel line 116 immediately upstream of combustor 106A is pressurized to the operational fuel pressure, any presence of non-flammable fluid 154 on an exterior of fuel line 116 may indicate a leak in fuel line 116. FIG. 1 shows an optical leak detector 142 for determining a presence of non-flammable fluid 154 on the exterior of fuel line 116. Optical leak detector 142 may include optical systems for determining the presence of non-flammable fluid 154 on the exterior of fuel line 116. In one embodiment, optical leak detector 142 may include a camera, a borescope, or any other means of remote optical viewing of fuel line 116. In another embodiment, optical leak detector 142 may include a user directly monitoring fuel line 116 for the presence of a leak.

Figure 2:
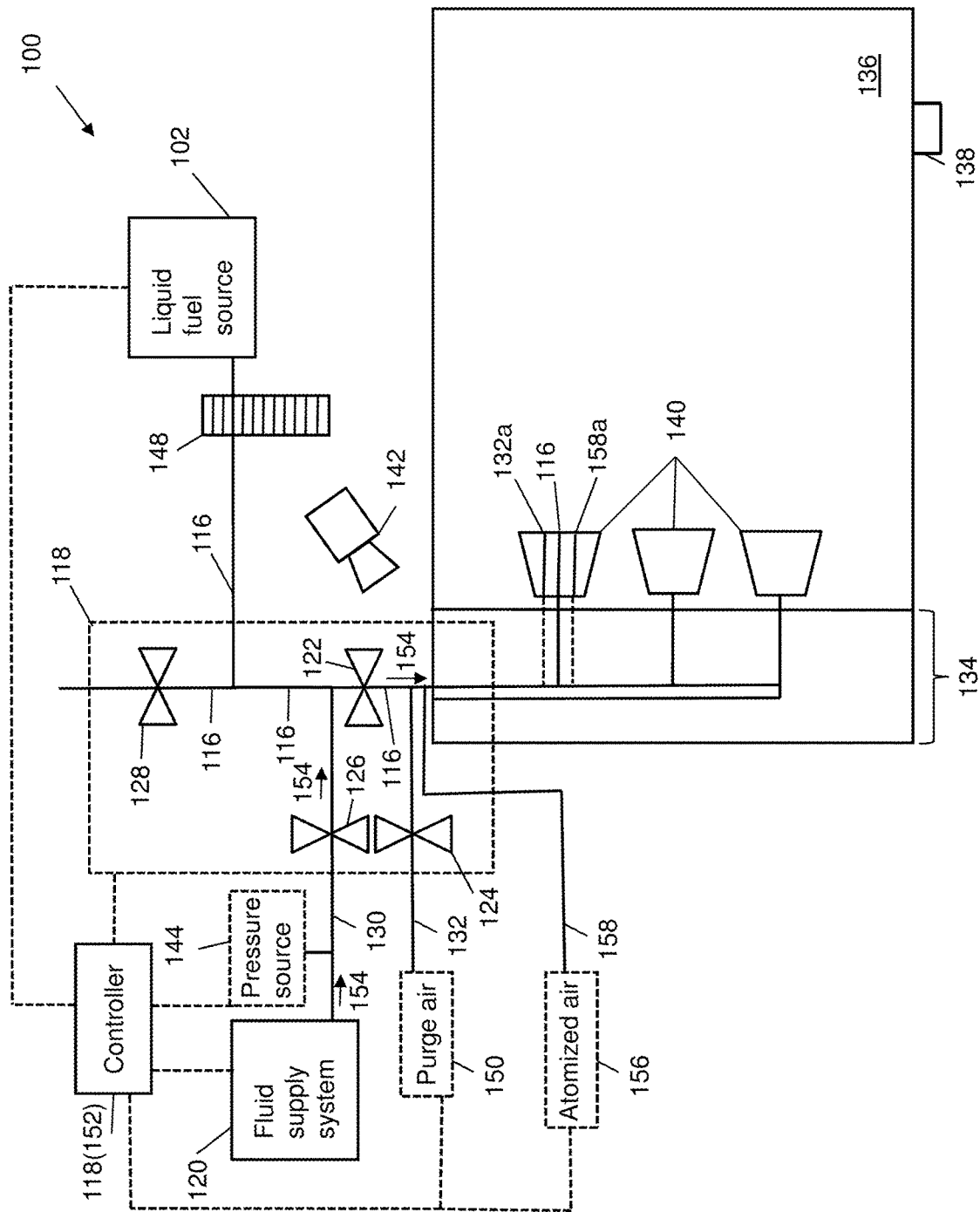
FIG. 2 shows a schematic diagram of a combustor and corresponding leak detection system according to embodiments of the disclosure.

FIG. 2 shows the present fuel line leak detection system with an enlarged view of combustor 106A and corresponding combustor components. FIG. 2 shows combustor components such as end cover 134, fuel nozzles 140, combustion chamber 136, and drain 138. As shown, fuel line 116 may terminate downstream of end cover 134 at one or more fuel nozzles 140. Fuel nozzles 140 may be configured to direct fuel to combustion chamber 136 during working operation of turbomachine system 100. However, the present leak detection system may include directing non-flammable fluid 154 through nozzles 140 to combustion chamber 136 at an operational fuel pressure of turbomachine system 100 while turbomachine system 100 is offline (i.e., not firing or producing work). In different embodiments, non-flammable fluid 154 may include materials such as air, nitrogen, water, or other non-flammable liquids and gasses. One advantage to using liquid as non-flammable fluid 154 may include easier detection. Non-flammable gasses such as air or nitrogen may be used, but additional equipment may be required to detect a colorless gas leaking from fuel line 116. For example, if air or nitrogen is used as non-flammable fluid 154, a dye may be added to the fluid to make a leak more visible. Another example may include a fluorescent dye added to the fluid that glows under ultraviolet light (i.e., a black light). Alternatively, if air or nitrogen is used as non-flammable fluid 154, the fluid may be heated such that a leak would be visible through an infrared camera. In an embodiment wherein non-flammable fluid 154 includes water, it may be relatively easy to detect water leaking from fuel line 116 compared to air because moisture located on the exterior of fuel line 116 may indicate a leak. After flowing through fuel line 116, the water may be directed to combustion chamber 136. If water builds up in combustion chamber 136 it may collect therein, if water collects in combustion chamber 136, it may eventually cause water to unnecessarily enter other compartments of turbomachine 100. Such a fluid collection condition may cause extended downtime of turbomachine system 100 due to repairs or extended drying of turbomachine system 100. In order to prevent such a scenario, combustion chamber 136 may include at least one water wash drain 138. Control system 118 may open drain 138 during leak detection (i.e., while the water is directed to combustion chamber 136). In one embodiment, drain 138 may include an approximately 12 millimeter (mm) diameter hose or pipe connected to a low point of combustion chamber 136. In another embodiment, drain 138 may include an approximately 19 mm diameter hose or pipe. In one embodiment, drain 138 may be configured to open in response to the delivering of non-flammable fluid 154 to combustor 106A, and be large enough to avoid collection of fluid in combustion chamber 136. In such an embodiment, drain 138 may have a flow rate greater than a flow rate of non-flammable fluid 154 delivered to combustor 106A at operational fuel pressure. Conventional combustion chamber drains may be configured to merely remove unburned fuel from the combustion chamber during shutdown of turbomachine system 100. The presently disclosed offline leak detection system may direct more fluid to combustion chamber 136 than a conventional combustor drain can remove because non-flammable fluid 154 may be directed to combustion chamber 136 at operation fuel pressure, yet none of non-flammable fluid 154 may be converted to a gas by ignition, as would fuel during normal operation. In such a scenario, drain 138 may be enlarged to meet the above criteria.

Turning turbomachine system 100 (commonly known as cranking in the art) during the presently disclosed offline leak detection may also decrease the likelihood of a fluid collection condition in combustion chamber 136. Turning turbomachine system 100 may increase the flow of liquid out of combustor 106A. Turbomachine system 100 may further include a starter 146 (shown in FIG. 1). Starter 146 may include a mechanical or electrical means, or a combination of mechanical and electrical means of rotating turbomachine system 100 (i.e., shaft 110) to a firing speed. In some embodiments, the firing speed of turbomachine system 100 may be approximately 10% to approximately 14% of an operational speed of turbomachine system 100. For example, if turbomachine system 100 has an operational speed of 3000 revolutions per minute (RPM), starter 146 may turn turbomachine system 100 to a speed between approximately 300 RPM to approximately 420 RPM. Turning shaft 110 to firing speed while non-flammable fluid 154 is delivered to combustor 106A may be beneficial in preventing a fluid collection condition in combustion chamber 136. Turning shaft 110 to firing speed during the offline leak test may allow air to flow through compressor 108, creating compressed air 112. Compressed air 112 may be directed to combustors 106 during leak testing, i.e., while fuel lines 116 upstream of combustors 106 are pressurized with non-flammable fluid 154. Supplying compressed air 112 to combustors 106 during the leak testing may increase the rate at which non-flammable fluid 154 may be removed from combustors 106 through respective drains 138. Additionally supplying compressed air 112 to combustors 106 during leak testing may increase the rate at which non-flammable fluid 154 may be removed from turbomachine system 100 by carrying any droplets of non-flammable fluid 154 that may be downstream of combustors 106 out of turbomachine system 100, i.e., to an exhaust (not shown) of turbomachine system 100.

FIG. 2 shows purge air source 150 connected to nozzles 140 by air lines 132. In one embodiment, purge air system 150, 132, 124 may supply compressed air to at least one air passage 132a (i.e., within nozzles 140) of combustor 106A during the pressurizing of fuel line 116 to prevent non-flammable fluid 154 from leaving the combustor through the at least one air passage during the pressurizing of fuel line 116. Purge air system 150, 132, 124 may supply compressed air to combustor 106A alone, or in addition to compressed air 112 supplied from compressor 108, described above. In some embodiments, nozzles 140 may include an additional air passage 158a for supplying atomized air to combustor 106A. In one such embodiment, the atomized air may be supplied by an atomized air source 156, such as an additional compressor. In this embodiment, atomized air source 156 may be connected to combustor 106A similarly to purge air system 150, 132, 124 described above. Atomized air source 156 may be switched on during the leak testing to increase air pressure in air lines 158 and increase a flow of atomized air to combustor 106A. In one embodiment, compressed air 112 from compressor 108, purge air from purge air system 150, 132, 124, and atomized air from atomized air source 156 may be simultaneously supplied to combustor 106A during the leak testing to reduce or prevent any backflow of non-flammable fluid 154 from combustor 106A into purge air lines 132, 132a and atomized air lines 158a, 158.

Figure 3:
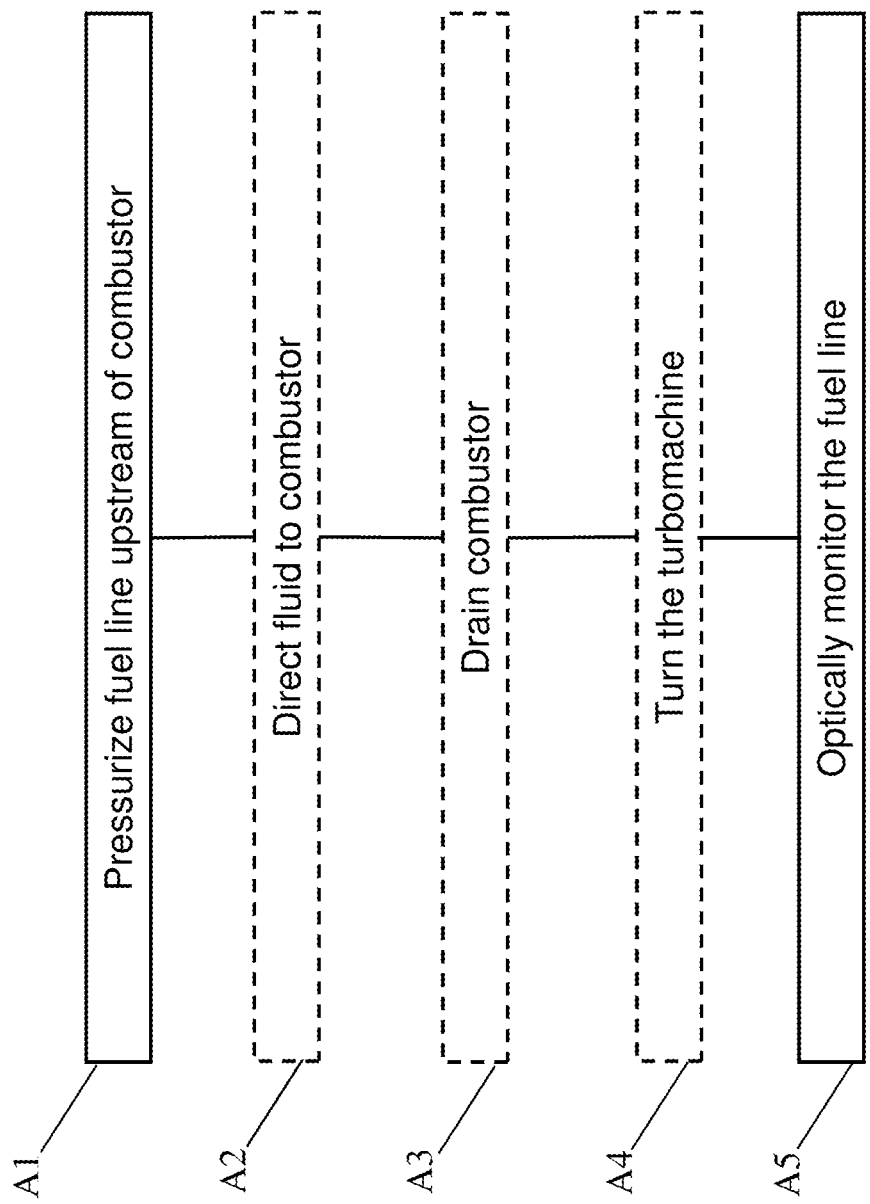
FIG. 3 shows a flow diagram illustrating processes according to various embodiments of the present disclosure.

FIG. 3 shows a flow diagram illustrating processes according to various embodiments of the present disclosure. For illustrative purposes, portions of the method refer to elements shown and described in FIGS. 1 and 2. Portions of the method shown in broken lines may be optional. As shown, various embodiments of a method of detecting a leak in a fuel system of a turbomachine can include:

Process A1: pressurizing fuel line 116 immediately upstream of combustion chamber 136 with non-flammable fluid 154 to a pressure substantially equal to an operational fuel pressure of turbomachine system 100. In one embodiment, pressurizing fuel line 116 may include pressuring fuel line 116 upstream of combustor 106A as well as downstream of an end cover assembly 134 of combustor 106A. Pressurizing fuel line 116 may include pressurizing fuel line 116 immediately upstream of combustor 106A with non-flammable fluid 154 to a pressure greater than or approximately equal to approximately 4.2 MPa.

Process A2: directing non-flammable fluid 154 to combustion chamber 136. In one embodiment, non-flammable fluid 154 may include water. In such an embodiment, fluid supply system 120 may include a water injection system of turbomachine system 100.

Action A3: opening at least one water wash drain 138 in combustion chamber 136. In an embodiment wherein non-flammable fluid 154 includes liquid water, the method may include opening at least one water wash drain 138 of combustion chamber 136 in response to the directing of non-flammable fluid 154 to combustion chamber 136. Opening drain 138 may prevent fluid collecting in combustion chamber 136 during the leak detection.

Action A4: turning turbomachine system 100 to a speed approximately 10% to approximately 14% of an operating speed of turbomachine system 100. Starter 146 may provide electric, mechanical, or electromechanical means for turning turbomachine system 100 while non-flammable fluid 154 is directed to combustion chamber 136.

Action A5: optically monitoring an exterior of fuel line 116 to determine a presence of non-flammable fluid 154, the presence of non-flammable fluid 154 on the exterior of fuel line 116 indicating a leak. Optically monitoring the exterior of fuel line 116 may include using optical leak detector 142. Optical leak detector 142 may include optical system, such as a camera, for determining the presence of non-flammable fluid 154 on the exterior of fuel line 116. In one embodiment, optical leak detector 142 may include a camera, a borescope, or any other means of remote optical viewing of fuel line 116. In another embodiment, optical leak detector 142 may include a user directly monitoring fuel line 116 for the presence of a leak.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "approximately" and "substantially" used herein are intended to modify the values they proceed to include +/−10% of the modified value.

This written description uses examples to describe the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of detecting a leak in a fuel system of a turbomachine having at least one combustor including a combustion chamber, the method comprising:
   pressurizing a fuel line immediately upstream of the combustion chamber with a non-flammable fluid to a pressure substantially equal to an operational fuel pressure of the turbomachine;
   optically monitoring an exterior of the fuel line to determine a presence of the non-flammable fluid at the exterior of the fuel line, the presence of the non-flammable fluid on the exterior of the fuel line indicating a leak; and
   delivering the non-flammable fluid to the combustion chamber of the combustor, whereby a drain coupled to the combustor is opened while the non-flammable fluid is being delivered to the combustion chamber, and wherein an exit flow rate of the non-flammable fluid exiting the combustion chamber via the drain is greater than a delivery flow rate of the non-flammable fluid being delivered to the combustion chamber.

2. The method of claim 1, wherein the pressurizing the fuel line includes pressurizing the fuel line downstream of an end cover assembly of the combustor.

3. The method of claim 1, wherein the non-flammable fluid is water, and the pressurizing of the fuel line includes pressurizing the fuel line with a water injection system of the turbomachine that is configured to direct water to a compressor of the turbomachine during a wash.

4. The method of claim 1, further comprising simultaneously supplying atomized air from an atomized air source to the combustor while directing the non-flammable fluid to the combustion chamber.

5. The method of claim 1, wherein the drain includes a hose connected to the combustor and in fluid communication with the combustion chamber, the hose having a diameter equal to approximately 12 millimeters.

6. The method of claim 1, wherein the pressurizing includes pressurizing the fuel line with the non-flammable fluid to a pressure greater than or approximately equal to 4.2 Megapascals (MPa).

7. The method of claim 1, further comprising turning the turbomachine to a speed approximately 10% to approximately 14% of an operating speed of the turbomachine during the pressurizing and the optical monitoring.

8. A leak detection system for a fuel system of a turbomachine having at least one combustor including a combustion chamber, the leak detection system comprising:
   a fluid supply system fluidly connected to at least one fuel line of the turbomachine, the fluid supply system for delivering a non-flammable fluid to the combustion chamber of the combustor, wherein a drain is coupled to the combustor and is configured to open in response to the non-flammable fluid is being delivered to the combustion chamber, and wherein the drain is sized to permit the non-flammable fluid to exit the combustion chamber at an exit flow rate that is greater than a delivery flow rate of the non-flammable fluid being delivered to the combustion chamber;
   a control system operably connected to the fluid supply system, the control system controlling a flow of the non-flammable fluid through the at least one fuel line, and controlling a pressure of the non-flammable fluid in the at least one fuel line to a pressure substantially equal to an operational fuel pressure of the turbomachine; and
   an optical monitoring system for determining a presence of the non-flammable fluid on an exterior of the at least one fuel line, the presence of the non-flammable fluid on the exterior of the at least one fuel line indicating a leak.

9. The leak detection system of claim 8, wherein the fluid supply system includes a water injection system of the turbomachine that is configured to direct water to a compressor of the turbomachine during a wash.

10. The leak detection system of claim 8, wherein the at least one fuel line is downstream of an end cover assembly of the combustor.

11. The leak detection system of claim 10, wherein the at least one fuel line includes a check valve upstream of the combustor, and wherein the at least one fuel line is pressurized from the check valve to the at least one combustor.

12. The leak detection system of claim 10, wherein the drain includes a hose connected to the combustor and in fluid communication with the combustion chamber, the hose having a diameter equal to approximately 12 millimeters.

13. The leak detection system of claim 8, wherein the control system is configured to control the pressure of the non-flammable fluid in the at least one fuel line to a pressure greater than or approximately equal to 4.2 Megapascals (MPa).

14. A fuel line leak detection system for a gas turbomachine comprising:
   a non-flammable fluid source fluidly connected to a plurality of fuel lines of the turbomachine upstream of a plurality of combustors of the turbomachine, each combustor of the plurality of combustors including a respective combustion chamber, the plurality of fuel lines delivering a non-flammable fluid to the respective combustion chamber of each combustor of the plurality of combustors, wherein each combustor of the plurality of combustors includes a drain in fluid communication with the respective combustion chamber of each combustor of the plurality of combustors, the drain being configured to open in response to the non-flammable fluid being delivered to the respective combustion chamber of each combustor of the plurality of combustors, and wherein the drain is sized to permit the non-flammable fluid to exit the respective combustion chamber of each combustor of the plurality of combustors at an exit flow rate that is greater than a delivery flow rate of non-flammable fluid being delivered to the respective combustion chamber of each combustor of the plurality of combustors;

a multiport valve fluidly connected to the plurality of fuel lines between the non-flammable fluid source and the plurality of combustors, the multiport valve directing the non-flammable fluid to individual ones of the plurality of combustors;

a pressure source fluidly connected to the plurality of fuel lines, the pressure source configured to pressurize the plurality of fuel lines immediately upstream of the combustor with the non-flammable fluid to a pressure substantially equal to an operational fuel pressure of the turbomachine; and means for determining a presence of the non-flammable fluid on an exterior of the plurality of fuel lines, the presence of the non-flammable fluid on the exterior of the plurality of fuel lines indicating a leak.

15. The fuel line leak detection system of claim 14, wherein the pressure source includes a pump having a variable frequency drive, the pump configured to maintain the pressure substantially equal to the operational fuel pressure of the turbomachine.

16. The fuel line leak detection system of claim 14, further comprising a starter connected to a rotor shaft of the turbomachine, the starter turning the rotor shaft to a speed approximately 10% to approximately 14% of an operating speed of the turbomachine while the non-flammable fluid is delivered to the plurality of combustors.

17. The fuel line leak detection system of claim 14, wherein each drain includes a hose in fluid communication with the respective combustion chamber, the hose having a diameter equal to approximately 12 millimeters.

18. The fuel line leak detection system of claim 14 wherein the drain prevents the non-flammable fluid from collecting in the plurality of combustors.

19. The fuel line leak detection system of claim 14, wherein the pressure source is configured to pressurize each fuel line of the plurality of fuel lines immediately upstream of each respective combustor of the plurality of combustors with the non-flammable fluid to a pressure greater than or approximately equal to 4.2 Megapascals (MPa).

\* \* \* \* \*